United States Patent [19]

Dobron

[11] Patent Number: 4,934,720
[45] Date of Patent: Jun. 19, 1990

[54] MOBILE CART HAVING ADJUSTABLE SUPPORTS

[76] Inventor: Frank J. Dobron, 164 W. College Ave., Milwaukee, Wis. 53207

[21] Appl. No.: 294,427

[22] Filed: Jan. 9, 1989

[51] Int. Cl.$^5$ ............................................... B60P 1/10
[52] U.S. Cl. ............................... 280/79.11; 108/56.1; 254/2 R
[58] Field of Search ............... 280/79.11, 79.3, 47.15, 280/47.34, 47.35; 108/149, 54.1, 56.1, 56.3; 211/186, 162, 175; 248/352; 254/2 R, 2 B, 7 R, 7 B

[56] References Cited

U.S. PATENT DOCUMENTS

| | | | |
|---|---|---|---|
| 734,919 | 7/1903 | Mast | 280/79.11 |
| 1,804,997 | 5/1931 | Manley | 280/79.3 |
| 2,445,004 | 7/1948 | Reynolds et al. | 280/79.3 |
| 2,828,931 | 4/1958 | Harvey | 108/54.1 |
| 3,949,976 | 4/1976 | Cofer | 280/47.15 |
| 4,210,341 | 7/1980 | Minkoff | 280/79.11 |
| 4,674,726 | 6/1987 | Roux | 248/352 |
| 4,720,115 | 1/1988 | Rehrig | 108/56.1 |

Primary Examiner—David M. Mitchell
Attorney, Agent, or Firm—Nilles & Nilles

[57] ABSTRACT

A mobile cart is disclosed for supporting and transporting loads having support points which vary in location and number. The cart has a base frame having a top edge lying in a first plane and an inner mounting ledge lying in a second plane below said first plane. Wheels having stem members are mounted to assemble the base frame and to make it mobile. Cross members dimensioned to fit in the space between the first and second planes are releasably mounted on the main frame to permit their adjustment into general alignment below the support points of the load which is to be subsequently supported by the cart. A first locking device is provided to secure the cross members in position. Supports are mounted on each cross member for movement in a first direction parallel to the horizontal plane of the base frame and in a second generally vertical direction relative to the base frame. A second locking device is provided to secure each support in its selected position.

3 Claims, 4 Drawing Sheets

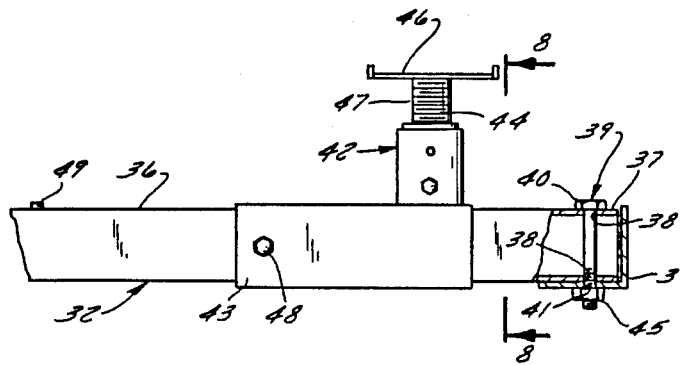
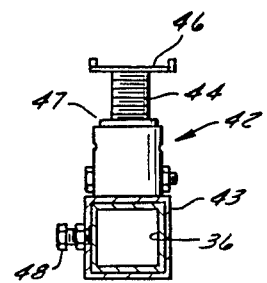
FIG. 7  FIG. 8
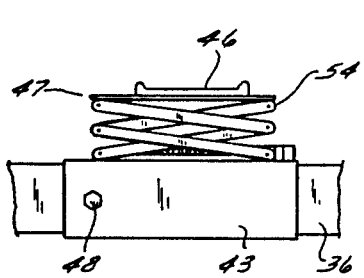
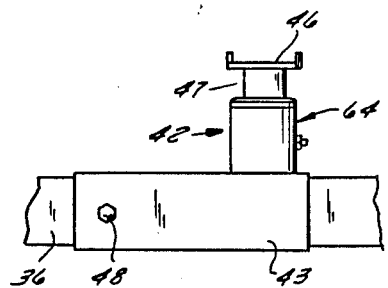
FIG. 9  FIG. 10
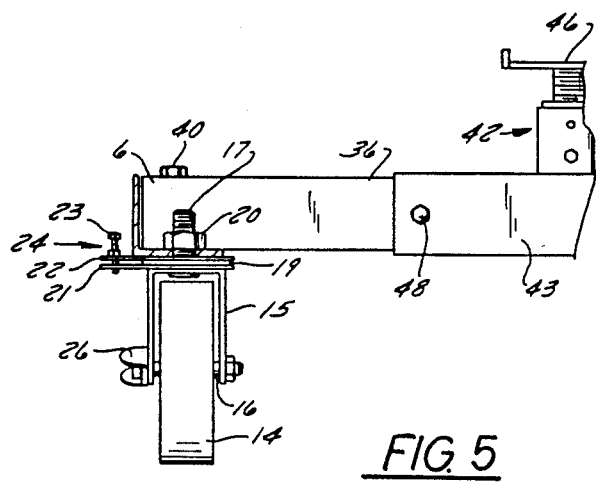
FIG. 5

MOBILE CART HAVING ADJUSTABLE SUPPORTS

BACKGROUND OF THE INVENTION

1. Field of the Invention

This invention relates to a portable load handling cart and in particular to a wheeled cart having support means which are variable in number and location to hold different types of loads in a manner permitting manual maneuvering of the cart and the supported load.

2. Description of the Prior Art

Many different types of wheeled carts are known for the purpose of supporting loads to permit both manual maneuverability, usually termed "dollying" and storage of the load. However, known wheeled carts have been unduly complex in design, expensive to manufacture and not well suited for supporting loads, such as motorized vehicles which have support points that vary in number and location to permit dollying thereof. Vehicles present many unique problems which make their support by a one maneuverable wheeled cart quite difficult. For example, vehicles such as automobiles, trucks, tractors, airplanes, etc. come in a wide variety of types and sizes: some with separate frames, some with unitary body and frames, and all having varying recommended support points which frequently must be used to avoid twisting or warping damage to the vehicle. Repair shops frequently receive damaged and disabled vehicles and because of the damage find themselves unable to support the vehicle to permit its maneuverability using any of the recommended support points. Automotive restoration shops frequently completely disassemble the vehicle and have need to maneuverably support only the body or only the chassis comprising the engine and frame without wheels.

In the prior art it has been the practice to provide specialized carts each tailored to support a specific type of load and therefore existing carts lacked versatility and scope of use. In an effort to provide versatility, wheeled carts have been designed for supporting each individual wheel of a vehicle as disclosed in U.S. Pat. No. 4,690,605, issued Sep. 1, 1987 to Albert V. Coccaro. However, if the vehicle ties are damaged, if the tires and rim have been removed from the vehicle, or if only the body must be maneuvered, this type of apparatus cannot be used to dolly the vehicle. Further, in order to dolly a vehicle, four dollies are required which increases expense. Wheeled carts heretofore known for supporting general loads, as exemplified by U.S. Pat. No. 4,641,845 issued Feb. 10, 1987 to Timothy W. Hewitt, do not provide any suitable means for quickly establishing a greater or lesser number of support points on the dolly nor do they provide universal adjustability over the entire area of the cart for the location of such support points to meet an infinite variety of support requirements.

SUMMARY OF THE INVENTION

The present invention provides an improved mobile cart for supporting and transporting loads that have support points which vary in location and number which will enable the user to adjust the load support means to accurately align with and support the load which is to be carried by the cart.

It is an object of the present invention to provide a cart that is of the utmost simplicity in design, economical to manufacture, quickly assembled and disassembled, and provides support means which may be increased or decreased in number with each support means being universally adjustable to any position within an area or field of support encompassed by the cart.

The cart of the present invention comprises a base frame that has a longitudinal extent and presents a horizontal plane of reference. Wheel means are mounted on the base frame to make the base frame mobile. A subframe means, which includes cross members, is mounted on the main frame. The cross members are mounted to permit their movement to any desired position in general alignment below the support points of the load which is to be supported by the cart. A first locking means is provided for securing the cross members in any selected position of adjustment. Support means are mounted on each of the cross members for movement in a first direction that is generally parallel to the horizontal plane of reference provided by the base frame and also for movement in a second direction that is generally vertical relative to the horizontal plane of reference to enable each of the support means to be accurately positioned at any predetermined support point for a load. A second locking means is provided to secure each of the support means in any desired position.

In the disclosed embodiment, the base frame includes a pair of spaced apart side support frame members and a pair of spaced apart end frame members arranged in a generally rectangular shape. The cross members each have spaced apart free ends slidably mounted on said side frame members to permit the cross members to be adjusted toward and away from the end frame members and the first locking means is provided to secure the free ends in any desired position of adjustment on the side frame members. Preferably each cross member extends transversely of the longitudinal extent of the base frame. The support means includes a slide member mounted on the cross member for movement along the transversely extending cross member and the load engaging means is mounted on the slide member for vertical adjustment relative to the horizontal plane of the base frame.

A further aspect of the invention resides in designing the component parts so they may be readily disassembled for storage and easily assembled for use. In order that the cart be easily disassembled, preferably the base frame will include a pair of spaced apart side frame members each having a pair of opposed first end members and a pair of spaced apart end frame members each having a pair of opposed second ends. A first aperture is provided in each of the first ends, and a second aperture through each of said second ends. The side and end frame members are arranged in a substantially rectangular shape having four corners with the first and second ends at each corner overlaying each other to present the first and second apertures in alignment. A wheel means is mounted adjacent each of the four corners to make the frame mobile. Each of the wheel means has an alignment means, preferably in the form of a threaded stem, removably mounted in aligned first and second apertures at each of the corners. A releasable fastening means, such as a nut, is threaded on the stem and tightened thus using the wheel stem to releasably secure each of the corners together. At least two cross members are positioned between the end frame members to extend from one of the spaced apart side frame members to the other side frame member. The cross members have opposed free ends with each free end overlying one of the side frame members to permit movement of the cross members in directions towards and away from the end frame member. A first releasable locking means, such as a nut and bolt, is provided for securing the cross members in any desired position of adjustment. A plurality of support means are slidably mounted on the cross members with each of the support means including a slide member movable along the cross member. Load engaging means are mounted on the slide members for vertical movement.

BRIEF DESCRIPTION OF THE DRAWINGS

Referring to the drawings:

FIG. 5 is a partial enlarged end view taken along line 5—5 of FIG. 2 showing one wheel assembly;

FIG. 7 is a partial side view taken along line 7—7 of FIG. 2 showing one form of support means;

FIG. 8 is a sectional view taken along line 8—8 of FIG. 7;

FIG. 9 is a partial side view of a cross frame member similar to FIG. 7 but showing an alternative form of support means;

FIG. 10 is a partial side view of a cross frame member similar to FIG. 7 but showing another alternative form of support means.

DESCRIPTION OF THE PREFERRED EMBODIMENT

Figure 1:
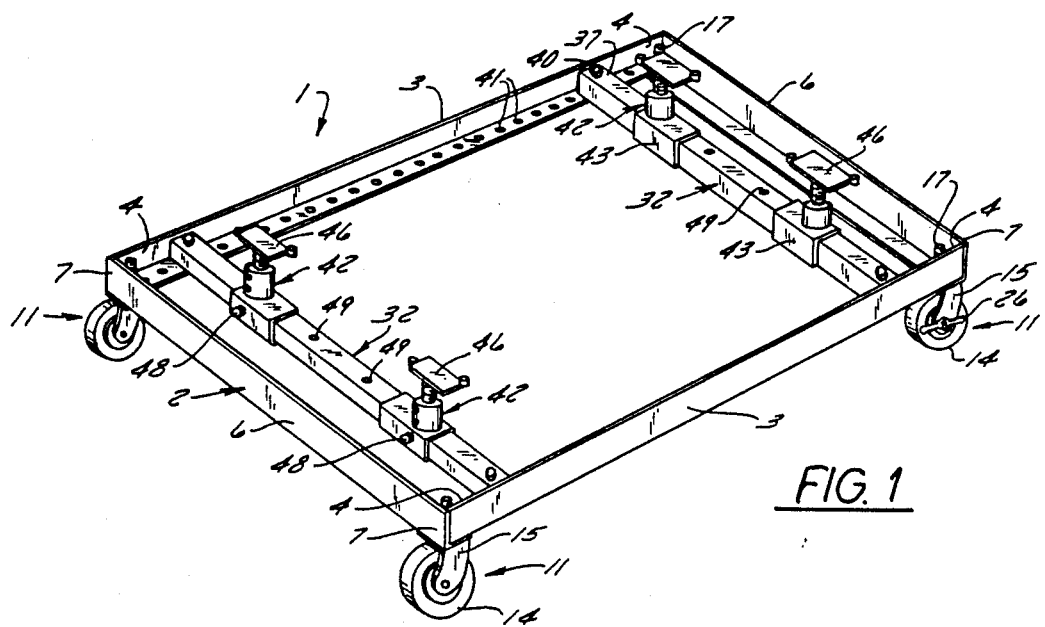
FIG. 1 is a mobile cart constructed according to the invention.

Referring to FIGS. 1-4, the mobile cart 1 comprises a base frame 2 and a subframe 32. The base frame 2 includes a pair of spaced apart side frame members 3 and end frame members 6. Each side frame member 3 has a pair of opposed first ends 4. A first aperture 5 is provided in each of the first ends 4. Each end frame member 6 also has a pair of opposed second ends 7. A second aperture 8 is provided in each of the second ends 7. The side and end frame members 3 and 6 may be of angle iron sized to provide the strength necessary to support the load to be dollied and are arranged in a substantially rectangular shape having four corners. The base frame 2 has a longitudinal extent provided by the side frame members 3 and the side and end frame members provide the frame with a horizontal plane of reference. The first ends 4 of side frames 3 overlay the second ends 7 of end frames 6 at each corner and the first and second apertures 5 and 8 are placed in alignment and releasably secured together, preferably by wheel means 11 as will now be described.

Figure 6:
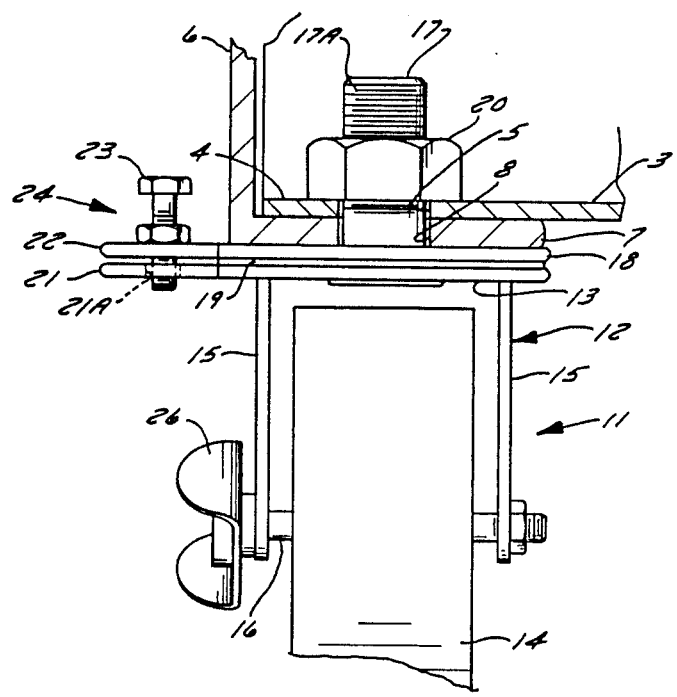
FIG. 6 is an enlarged sectional view of the wheel assembly shown in FIG. 5.

A wheel means 11 is mounted adjacent each of the corners of the base frame to provide mobility for the base frame. The wheel means 11 is best shown in FIG. 6 and comprises a yoke 12 having a pair of spaced apart depending leg members 15 connected by a cross member 13. The leg members 15 are apertured to receive an axle 16 therethrough upon which a wheel 14 is rotatably mounted. A stem member 17 is secured to the cross member 13 to extend vertically upward. The stem 17 constitutes an alignment means which is removably inserted through the aligned first and second apertures 5 and 8 at each of the corners. The free end of the stem member 17 has a threaded portion 17A and a releasable fastening means in the form of a nut 20 is threaded onto the threaded portion in order to releasably secure the base frame side and end frame members 3 and 6 together. The wheel means 11 has a lower bearing race on cross member 13 and an upper bearing race 18. A bearing means 19 is mounted between the upper and lower races to permit pivotal movement of the wheel and yoke about the vertical axis of stem 17. If desired, a bolt and nut assembly, not shown, could be used to releasably secure the corners of frame members 3 and 6 together and the wheel means 11 could be secured to the frame members in any suitable way such as welding or bolting.

Figure 2:
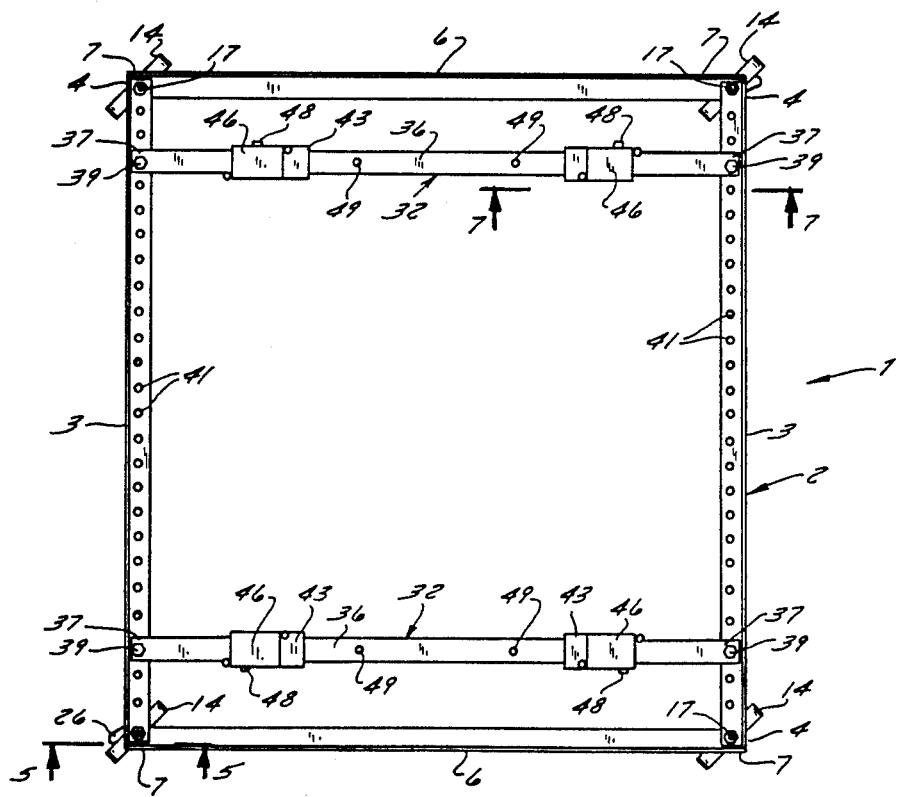
FIG. 2 is a plan view of the mobile cart shown in FIG. 1.
Figure 4:
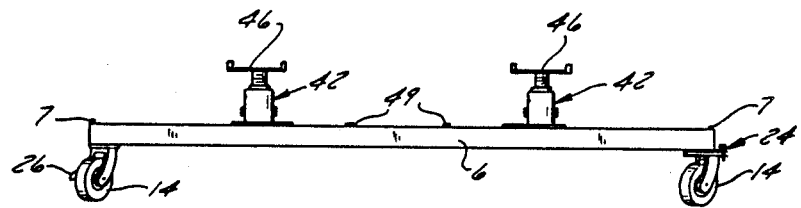
FIG. 4 is an end view of the mobile cart shown in FIG. 1.
Figure 3:
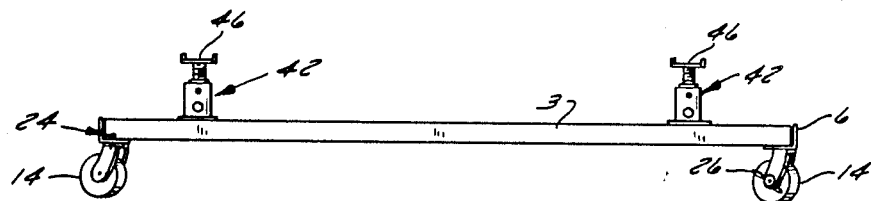
FIG. 3 is a side view of the mobile cart shown in FIG. 1.

An antipivot means 24 is provided for one or more of the wheel means 11. The cross member 13 and the upper race 18 have projecting lower and upper tabs 21 and 22, respectively. The lower tab 21 is provided with an aperture 21A. The upper tab 22 is internally threaded and an antipivot pin in the form of cap screw 23 is threaded through tab 22 and into the aperture 21A of tab 21. During normal operation, the wheel means 11 is free to pivot about the vertical axis of stem 17. If desired, pivoting of the wheel means about the axis of stem 17 can be prevented by threading pin 23 downward to project into aperture 21A and engage tab 21 which will cause the base frame to travel in a straight line when moved. In addition, one or more of the wheel means 11 are provided with a conventional frictional brake 26 as shown in FIG. 2.

The subframe 32 is adjustably mounted on the main frame 2. Preferably the subframe will include at least two spaced apart cross members 36 that are mounted on the main frame to permit their movement toward and away from each other and the end frame members 6. The movement of the cross frame members may be in directions that are generally parallel to the longitudinal extent of the base frame but could be designed to also move in other directions. The basic requirement is that subframe 36 be designed to permit movement necessary to enable the cross members 36 to be placed in positions that are in general alignment with but below the support points of any load which is subsequently to be supported by the cart, as will be more fully explained hereinafter. Each cross member 36 has spaced apart free ends 37 which are slidably supported on the side frame members 3.

A first locking means 39 (FIG. 7) is provided to secure each of the free ends 37 of the cross members to its respective side frame member 3. Preferably the first locking means will comprise a series of apertures 41 spaced apart from each other longitudinally along each of the side frame members 3 which are alignable with corresponding apertures 38 provided in the free ends 37 of each of the cross members 36 and bolts 40 which are secured therein to lock the end of the cross member in any desired position of adjustment. Instead of using apertures and bolts, it would be also possible to utilize other conventional forms of clamping means to releasably lock the ends of the cross members in place. As shown in FIG. 2, the cross members 36 extend transversely at right angles to the longitudinal extent of the base frame. If desired, the cross members could be mounted to extend diagonally across the side frame members 3 at any desired angle. While the preferred embodiment shows two straight cross members 36, lesser or greater number of cross members could be used depending on the nature of the loads which are to be supported. The cross members could be other than straight and could be adjustably interconnected to form a slidable subframe unit.

One or more support means 42, best shown in FIGS. 7-10, are mounted on each of the cross members for movement in a first direction which is generally parallel to a horizontal plane of reference provided by the base frame 2. The support means 42 are also movable in a second direction that is generally vertical relative to the horizontal plane of reference in which the base frame lies. More specifically, the support means 42 includes slide member 43 mounted on the cross member. The slide member may support one of several different types of vertically adjustable load engaging means 47 as, for example, screw jack 44, FIG. 8, scissors jack 54, FIG. 9, or a hydraulic or air actuated jack 64, FIG. 10. In each instance the jacking device provides for vertical adjustment of a rest pad 46 which may be configured in any desired shape to engage the support point of the load which is to be carried by the mobile frame.

Preferably the cross members 36 are tubular in shape and the slide member 43 is also tubular in shape with an internal configuration adapted to conform to and slidably receive therein the outer periphery of the cross member on which it is mounted. The slide member 43 can be secured in any desired position of adjustment by a second locking means in the form of a jam bolt 48 which is threaded to extend through the slide member 43 and into contact with the cross member on which it is mounted. If desired, a position limit means in the form of stop members 49 are provided on the cross members 36 to index or limit the transverse movement of the slide members 43. The stop members 49 could be fixed or movable as, for example, a pin insertable in any one of a series of holes (not shown) in cross member 36. If the stop members 49 are used for indexing, they can be positioned to permit the slide members to be quickly returned to any predetermined position. While the embodiment shown in FIG. 2 discloses the use of two support means 42 on each of the cross members 36, a greater or lesser number of supports could be provided depending upon the number of support points of the load which is to be supported by the frame.

Figure 12:
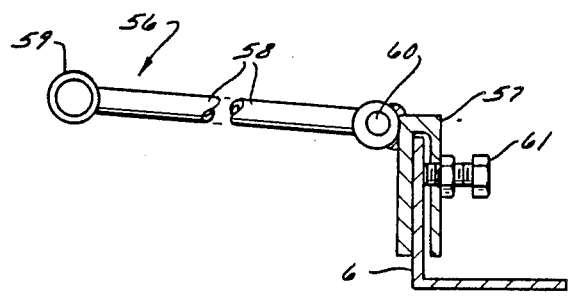
FIG. 12 is a sectional view taken along line 12—12 of FIG. 11.
Figure 11:
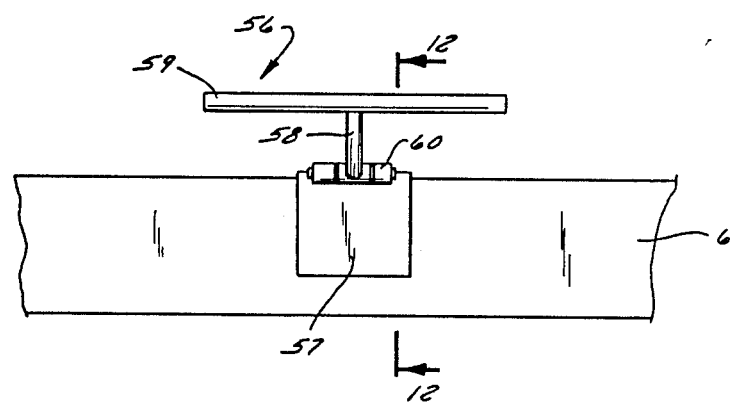
FIG. 11 is a partial elevational view of an optional handle that may be attached to the cart.

If desired, an optional handle assembly 56 may be fixed or removably attached to either of the frame members 3 or 6, and FIGS. 11 and 12 show one type of handle assembly removably secured on frame member 6. The handle assembly 56 includes a U-shaped base member 57, an extension member 58 which can be made as long as required by the extent of load overhang, and a transverse grab bar 59. Preferably the extension is attached to the base 57 by a hinge 60. A jam bolt 61 is threaded into base member 57 to removably lock it into any desired position on the cart.

ASSEMBLY AND OPERATION

To assemble the mobile frame, the side frame members are placed in overlying relation to the end frame members 6 with the apertures 5 and 8 in their respective ends in alignment. The threaded stems 17 of the wheel means 11 are inserted through the apertures and nuts 20 are tightened in order to secure the base frame in its assembled condition. Thus the stems 17 serve a dual function: they mount the wheel means on the frame and also serve to bolt the frame together. The cross members 36 are then laid on top of the side frame members 3 with the apertures 38 in the ends thereof in overlying alignment with any one of the selected apertures 41 in the side frame members 3 Bolts 40 are inserted through the aligned apertures 38 and 41 and a nut 45 threaded thereon to secure each end of a cross member in its desired position of adjustment.

From the foregoing description it will be appreciated that the mobile frame as disclosed can be assembled and disassembled by threading or unthreading only eight nuts: the four nuts 45 which secure the two cross members in place, and the four nuts 20 which secure the wheel members in place. Bolting of the cross members in place reenforces the base frame and minimizes risk of distortion thereof. If required, other diagonal reenforcing could be provided.

In operation, the recommended support points for the load to be carried by the mobile frame are noted. The cross frame members 36 are then adjusted into position so as to be in general alignment below the support points of the load which is to be subsequently supported and secured therein by means of the bolts 40. The slide members 43 on each of the cross members are then moved transversely of the base frame in a first direction which is generally parallel to the horizontal plane of reference in which the base frame lies to place the load engaging jack device 44 so that its support pad 46 will be precisely below the support point when the load is subsequently placed on the cart. The jack device 44 is then moved in a second direction which is generally vertical, that is, at right angles to the horizontal plane of the base frame 2 to place the rest pads 46 at the precise vertical elevational location for proper support of the load which is to be carried.

The load, if it is a vehicle, is then raised, the mobile cart rolled under the vehicle and then aligned with the prealigned support pads of the cart below the recommended support points of the load. The vehicle is then lowered onto the support frame. The cart wheels 11 permit the vehicle to be maneuvered in any direction. If it is desired to move the vehicle in only a straight line direction, at least one antipivot means 24 is engaged, as shown in FIG. 6, to prevent the wheel from pivoting about the axis of stem 17. The mobile cart may be secured against movement by engagement of the brake means 26 at one or more of the wheel assemblies 11 and, of course, if the cart is to be positioned on an inclined surface or stored with the load thereon, all of the wheels should be chocked.

From the foregoing description, it will be understood that a mobile cart has been disclosed having a minimum number of parts which can be readily assembled and disassembled for storage purposes and which permits quick and precise adjustment of the support means to enable the cart to support and transport a wide variety of vehicles that have support points which vary in location and in number.

The foregoing description discloses a preferred embodiment but other variations of the disclosed embodiment will be obvious to those skilled in the art without deviating from the inventive concepts disclosed herein.

What is claimed is:

1. A mobile cart that can be readily assembled for supporting and transporting loads presenting support points which vary in location and number and which can be quickly disassembled for compact storage comprising:
- a base frame (2) including
  - a pair of spaced apart side frame members (3) each having a pair of opposed first ends (4) and a first aperture (5) through each of said first ends,
  - a pair of spaced apart end frame members (6) each having a pair of opposed second ends (7), and a second aperture (8) through each of said second ends,
  - said side and end frame members arranged to define a substantially rectangular shaped opening having four corners with said first and second ends at each corner overlying each other to present said respective first and second apertures in alignment,
  - each of said frame members having a top edge lying in a first horizontal plane and a flange lying below said first horizontal plane, said flanges projecting toward the inside of said rectangular opening to provide an inner peripheral mounting ledge around said rectangular opening lying in a second horizontal plane spaced below said first horizontal plane;
- a wheel means (11) mounted adjacent each of said corners to make said frame mobile, each of said wheel means having a stem member removably mounted in said aligned first and second apertures at each of said corners;
- a releasable fastening means on each of said stem members to secure said wheel means to said base frame and fasten each of said corners together to permit quick assembly and disassembly of said frame members;
- at least two cross members (36) each extending from one of said spaced apart side frame members to the other side frame member, each of said cross members having a vertical dimension permitting it to fit in the space that is between said first and second planes and spaced apart free ends (37) with each free end supported by said inner peripheral flange for movement in directions toward and away from said end frame members;
- a first releasable locking means (39) for securing each of said cross members in any desired position of adjustment;
- a plurality of support means (42) slidably mounted on said cross members, each of said support means including a slide member (43) movable along said cross member, and a load engaging means (47) mounted on said slide member for vertical movement toward and away from said cross member; and
- a second releasable locking means (48) for securing each of said slide members in any desired position.

2. A mobile cart according to claim 1 wherein said wheel means includes a wheel mounted for pivotal movement about a vertical axis and wherein an antipivot means is mounted on said main frame for selective engagement with said wheel means to prevent said pivotal movement when desired.

3. A mobile cart according to claim 1 wherein a position limit means (49) is provided on said cross members to enable said slide member to be quickly moved to a predetermined position.

* * * * *